United States Patent [19]

Grave et al.

[11] Patent Number: 5,005,207
[45] Date of Patent: Apr. 2, 1991

[54] METHOD OF CONTROLLING THE SPEED OF A D.C. MOTOR AND DEVICE FOR CARRYING OUT THE METHOD

[75] Inventors: Georges A. Grave, Maintenon; Jean-Pierre Gaslonde, Caen, both of France

[73] Assignee: U. S. Philips Corporation, New York, N.Y.

[21] Appl. No.: 132,679

[22] Filed: Dec. 14, 1987

Related U.S. Application Data

[63] Continuation of Ser. No. 392,047, Jun. 25, 1982, abandoned.

[30] Foreign Application Priority Data

Jul. 9, 1981 [FR] France ............................ 81 13545

[51] Int. Cl.$^5$ ........................................... H02P 5/165
[52] U.S. Cl. ................................. 388/816; 388/928.1
[58] Field of Search .............. 318/310, 311, 312, 317, 318/319, 268, 458, 461, 470, 313, 318, 315, 326, 327, 334, 331, 345 B, 345 F, 268, 458; 388/816, 817

[56] References Cited

PUBLICATIONS

R. Boylestad et al., "Electronic Devices and Circuit Theory", Prentice-Hall, Inc., Englewood Cliffs, N.J., 1972, pp. 535–540, 552–557.

Primary Examiner—Ulysses Weldon
Attorney, Agent, or Firm—Bernard Franzblau

[57] ABSTRACT

A device for controlling the speed of a d.c. motor (M) employs a method in which the motor supply voltage (V) is controlled by a control voltage (Vo) supplied by a comparator circuit (11) which compares a reference signal ($S_{ref}$) with a signal ($S_V$) representing the motor speed. The signal ($S_V$) is derived from a signal ($S_M$) induced by the motor rotation via a signal processing circuit (21). The motor supply voltage (V) is controlled by the control voltage ($V_o$) by means of a negative resistance circuit (31) ($-R$), which at least partly compensates for the internal resistance (r) of the motor.

16 Claims, 2 Drawing Sheets

METHOD OF CONTROLLING THE SPEED OF A D.C. MOTOR AND DEVICE FOR CARRYING OUT THE METHOD

This is a continuation of application Ser. No. 392,047, filed June 25, 1982, now abandoned.

This invention relates to a method of controlling the speed of a d.c. motor in which method the supply voltage of the motor is controlled by a direct voltage, called a control voltage, which voltage is supplied by a circuit which compares a reference signal with a motor-speed measuring signal that is supplied by a circuit which processes a signal induced by the rotation of the motor. It also relates to a device for controlling the speed of a d.c. motor, which device comprises a circuit which processes a signal induced by the rotation of the motor. The processing circuit comprises a shaping circuit followed by an integrator circuit which supplies a motor-speed measuring signal formed by a direct voltage which is proportional to the motor speed. This direct voltage is compared with a reference voltage by means of a comparator circuit which comprises an operational amplifier at whose output terminal a control signal is produced which serves to control the supply voltage of the motor.

The control method and device in accordance with the invention are particularly suitable for use in magnetic-tape sound recording and reproducing equipment, in particular in equipment intended for use in motor-cars.

A device for controlling a d.c. motor operating in accordance with the method described in the preamble is known from U.S. Pat. No. 3,234,447. This U.S. Patent proposes a motor control device in which a signal induced by the rotation of the motor is magnetically induced in a stationary coil by two permanent magnets which are rigidly mounted on the motor shaft. The signal induced by the rotation of the motor is subsequently shaped and integrated by a processing circuit which produced a direct voltage at its output, which direct voltage is proportional to the motor speed. This direct voltage is then compared with a reference voltage by a comparator circuit which supplies a voltage which controls the motor current.

This type of motor control device provides a satisfactory compensation for slow variations in the speed of rotation of the motor, for example those which occur as a result of variations of the internal resistance of the motor as a function of the temperature. However, in general said device does not provide a satisfactory compensation for rapid speed fluctuations, which compensation error is substantial, especially when the signal induced by the rotation of the motor is a signal of low frequency, typically below 1000 Hz. The limited information available per unit of time then demands a high integration time constant of the processing circuit which is incompatible with a fast response of the control system.

It is an object of the present invention to mitigate this drawback by means of a control method which provides a correct compensation both for rapid and slow speed variations.

According to the invention, a method of controlling the speed of a d.c. motor controls the supply voltage of the motor by a direct voltage, called a control voltage, which voltage is supplied by a circuit which compares a reference signal with a motor-speed measuring signal. The motor-speed measuring signal is supplied by a circuit which processes a signal induced by the rotation of the motor. The method is characterized in that the signal induced by the rotation of the motor is a substantially periodic signal of low frequency, the motor supply voltage being controlled by the control voltage by means of a "negative-resistance" circuit which at least partly compensates for the internal resistance of the motor. In this way, as will be set forth hereinafter, the back-e.m.f. of the motor is substantially independent of the motor current so that the motor speed is consequently substantially insensitive to instantaneous load fluctuations.

In a special application of the method in accordance with the invention the signal induced by the rotation of the motor is obtained from pulses produced by an interruption of the current in the brushes of the motor. This method of obtaining the signal induced by the rotation of the motor has the advantage that it can be implemented in a very simple and convenient manner because it requires no auxiliary element coupled to the motor.

The invention also relates to a device for carrying out the method in accordance with the invention.

According to the present invention a device for controlling the speed of a d.c. motor comprises a circuit which processes a signal induced by the rotation of the motor. The processing circuit comprises a shaping circuit followed by an integrator circuit which supplies a motor-speed measuring signal formed by a direct voltage which is proportional to the motor speed. The direct voltage is compared with a reference voltage by means of a comparator circuit which comprises an operational amplifier having an output terminal at which a control signal is produced which serves to control the supply voltage of the motor. The device is characterized in that the signal induced by the rotation of the motor is a substantially periodic signal of low frequency. The device also comprises, arranged between the comparator circuit and the motor, a "negative-resistance" circuit which at least partly compensates for the internal resistance of the motor. The control voltage is applied to an input terminal of the negative-resistance circuit".

In a particularly advantageous embodiment of the device in accordance with the invention the signal induced by the rotation of the motor is formed by pulses produced by the interruption of the current in the motor brushes, said pulses being available in a branch of the negative-resistance circuit through which the motor current flows.

Finally, said negative-resistance circuit may be formed by a circuit of the "current-mirror" type.

The invention will now be described in more detail, by way of non-limitative example, with reference to the accompanying drawings in which.

Figure 1:
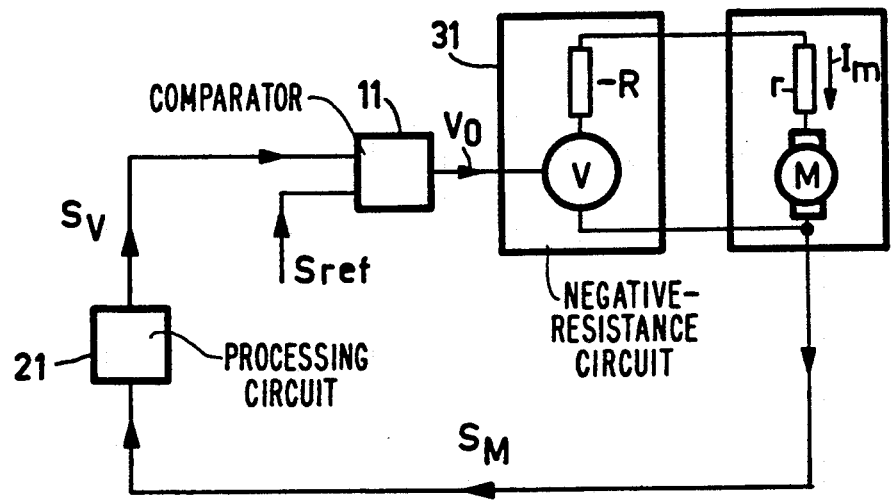
FIG. 1 is a block diagram of a control device using the method in accordance with the invention.

FIG. 1 is a diagram of a device for controlling a d.c. motor M using a method in which the supply voltage V of the motor M is controlled by a direct voltage Vo, called the control voltage. This voltage Vo is supplied by a circuit 11 which compares a reference signal $S_{ref}$ with a signal $S_v$ which is a measure of the speed of the motor M. The signal $S_v$ is supplied by a circuit 21 which processes a signal $S_M$ induced by the rotation of the motor M. As can be seen in FIG. 1, the supply voltage V of the motor is controlled by the control voltage Vo by means of a circuit 31 having a "negative resistance" −R, which compensates at least partly for the internal resistance r of the motor M. This arrangement is particularly favourable when the signal $S_M$ induced by the rotation of the motor is a substantially periodic signal of low frequency, for example below 1000 Hz, because in this case the inadequate information supplied by the motor M would mean that the processing circuit is required to have a large time constant, which is incompatible with a satisfactory compensation for rapid speed fluctuations. For the device shown in FIG. 1 the back-e.m.f. E' of the motor M satisfies the relationship $$E' = V - (r - R)I_m \quad (1)$$

Thus, when the resistance R approximates the internal resistance r of the motor, the speed of rotation N of the motor, which is proportional to E', is given by:

$$N = k(V - \epsilon(Im)) \quad (2)$$

in which k is a proportionally constant and $\epsilon(IM)$ is a residual term caused by imperfect compensation of the internal resistance r by the resistance R. In principle, control is effected by adjusting the supply voltage V in such a way that the residual term $\epsilon(Im)$ is eliminated, which is effected by means of the control voltage Vo. Relationship (2) shows that the speed of rotation N is independent of the motor current $I_m$, so that said current is insensitive to rapid load fluctuations.

It will now be appreciated that the signal $S_M$ induced by the rotation of the motor M can be derived from pulses caused by interruption of the current in the motor brushes. This solution has the advantage that it is much more economical than, for example, the use of a tachogenerator.

Figure 2:
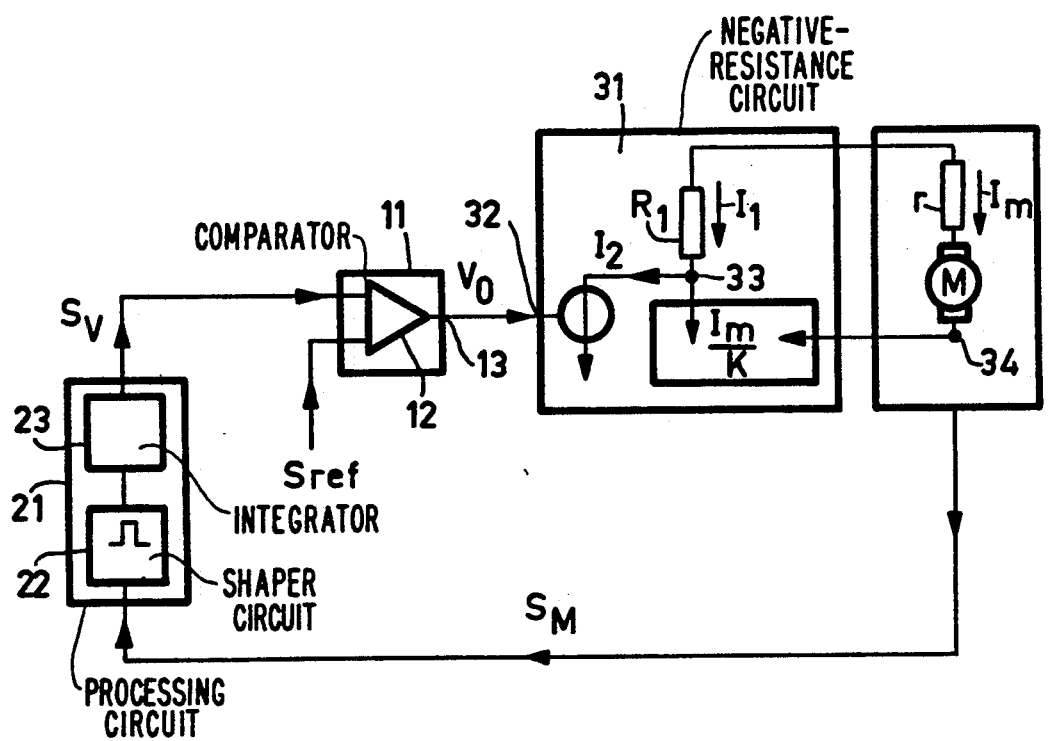
FIG. 2 is a circuit diagram of a motor control device in accordance with the invention.

FIG. 2 is a circuit diagram of a control device in accordance with the invention. This device comprises a circuit 21 for processing a signal $S_M$ induced by the rotation of the motor M. This processing circuit comprises a shaper circuit 22 followed by an integrator circuit 23 which supplies a motor-speed measuring signal $S_V$ formed by a direct voltage which is proportional to the motor speed. Subsequently, this direct voltage is compared with a reference voltage $S_{ref}$ by means of a comparator circuit 11 which comprises an operational amplifier 12 having an output terminal 13 at which a control voltage Vo for controlling the motor supply voltage is available. As can be seen in FIG. 2, the control device in accordance with the invention also comprises, arranged between the comparator circuit 11 and the motor M, a negative-resistance circuit 31 which at least partly compensates for the internal resistance r of the motor. The control voltage Vo is applied to an input terminal 32 of said negative-resistance circuit 31. In the example shown in FIG. 2 the negative-resistance circuit 31 is a circuit of the "current mirror" type. In this circuit the current $I_1$ flowing through the resistance $R_1$ is divided between two branches at the junction point 33. In one of these branches a current $I_2$ is obtained and in the other branch the current $I_m/K$, in which $I_m$ is the motor current and K is a characteristic parameter of the circuit 31. This means that:

$$I_1 = I_2 + I_m/K \quad (3)$$

If points 33 and 34 are at the same potential, it follows that:

$$E' + rI_m = R_1 I_1 \quad (4),$$

so that combining (3) and (4) yields $$E' = R_1 I_2 - (r - R_1/K) I_m \quad (5)$$

A comparison of relations (1) and (5) shows that the "negative resistance" of the circuit 31 is defined by the quantity $R_1/K$ and that the supply voltage V of the motor is represented by the term $R_1 I_2$. Since the resistance $R_1$ is adjusted so that $R_1/K$ largely compensates for the internal resistance r of the motor, the speed of rotation N of the motor is given by:

$$N = k(R_1 I_2 - \epsilon(Im)) \quad (6)$$

Since the resistance $R_1$ is fixed, it is found that the speed N is controlled by correcting $I_2$ via Vo so as to compensate for the residual term $\epsilon(Im)$.

Figure 3:
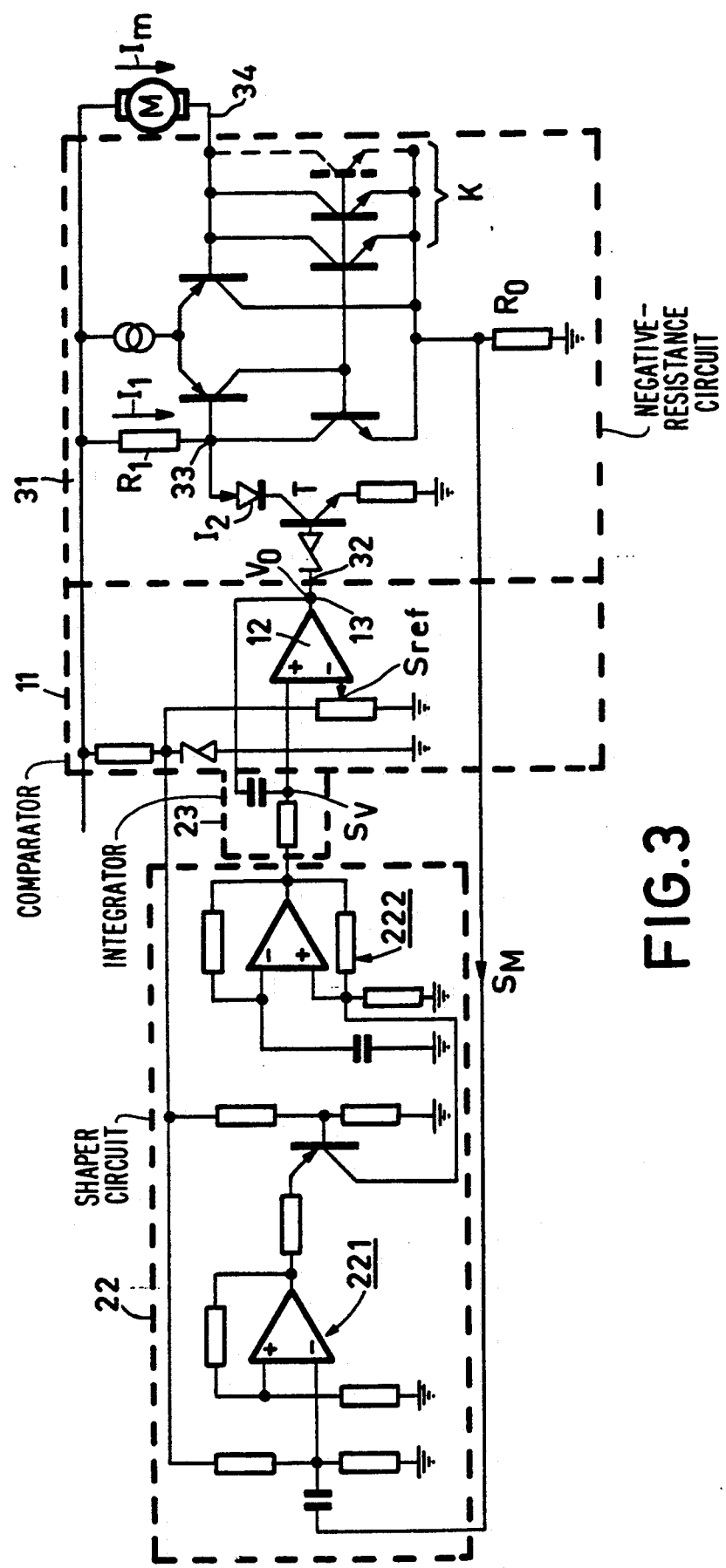
FIG. 3 shows an embodiment of a control device of the type shown in FIG. 2.

FIG. 3 shows an embodiment of a control device in accordance with the circuit diagram of FIG. 2. The shaper circuit 22 comprises a Schmitt trigger 221 followed by a monostable multivibrator 222. The integrator circuit 23 is of the resistance/capacitance RC-type. The comparator circuit 11 comprises an operational amplifier 12 which supplies the control voltage Vo for controlling the current $I_2$ via the transistor T arranged at the input of the negative-resistance circuit 31. This circuit 31 is of the "current-mirror" type and has a coefficient K of the order of magnitude of, for example, 10.

As can be seen in FIG. 3, the signal $S_M$ induced by the motor rotation comprises pulses obtained by the interruption of the current $I_m$ in the motor brushes. Said pulses are available in a branch of the negative-resistance circuit 31 in which the motor current flows. In the device shown in FIG. 3 the signal $S_M$ is available across the resistor $R_O$.

The invention is not limited to the device described with reference to FIG. 3, which employs a specific type of comparator circuit. It is evident that any other known comparator means may be used, for example a comparator which compares the frequency of the pulses supplied by the motor with the fixed frequency of a quartz oscillator. Similarly, the signal induced by the motor rotation may alternatively be produced by magnetic induction in a stationary coil by means of permanent magnets which are rigidly mounted on the motor shaft, or by an optical device comprising a stationary light source and detector associated with mirrors mounted on the motor shaft.

What is claimed is:

1. A device for controlling the speed of a d.c. motor comprising: means for deriving a low frequency periodic signal ($S_M$) induced by rotation of the motor, a circuit for processing said periodic signal, said processing circuit including a shaping circuit connected in cascade with an integrator circuit which supplies a motor-speed signal ($S_V$) comprising a direct voltage proportional to the motor-speed, a comparator circuit which compares said direct voltage ($S_v$) with a reference voltage ($S_{ref}$), said comparator circuit having an output terminal at which a control voltage ($V_o$) is produced, and a "negative-resistance" circuit coupled to the output terminal of the comparator circuit and to the motor such that the negative-resistance circuit at least partly compensates for the internal resistance of the motor, said control voltage being applied to an input terminal of said negative-resistance circuit so as to control the motor supply voltage to a value which is a substantially linear combination of the motor current and the control voltage.

2. A control device as claimed in claim 1, wherein the negative-resistance circuit includes a branch circuit through which the motor current flows and the signal ($S_M$) induced by the rotation of the motor is formed by pulses produced by interruption of the current in the brushes of the motor, and wherein said pulses flow in said branch of the negative-resistance circuit.

3. A control device as claimed in the claims 1 or 2, wherein said negative-resistance circuit is a circuit of the "current-mirror" type.

4. A control device as claimed in claim 1 wherein said negative resistance circuit includes a resistor with a resistance value $R_1$ having one terminal coupled to the motor and to a source of motor supply voltage and a second terminal coupled to first and second branch circuits such that a current $I_1$ flowing through said resistor divides into currents $I_2$ and $I_m/K$ in said first and second branch circuits, respectively, where $I_m$ is the motor current and K is a characteristic parameter of the negative resistance circuit, wherein the values of $R_1$ and K are chosen so that $R_1/K$ defines the negative resistance of the negative resistance circuit and is approximately equal to the internal resistance (r) of the motor, and wherein said control voltage ($V_O$) applied to said input terminal of the negative resistance circuit controls the current $I_2$ in said second branch circuit such that the motor speed is proportional to the current $I_2$.

5. A control device as claimed in claim 1 wherein a current $I_m$ flows through the motor from a source of supply voltage and said negative resistance circuit comprises a branch circuit through which a reference current $I_2$ flows and with a control device in said branch circuit controlled by said control voltage ($V_O$) so as to adjust the reference current in a manner to compensate for slow variations in the motor speed.

6. A method of controlling the speed of a DC motor in which the motor supply voltage is controlled by a DC control voltage comprising the following steps:
deriving a low frequency periodic signal proportional to motor speed and induced by rotation of the motor, processing said periodic signal by means of a circuit that produces a motor-speed measuring signal proportional to motor speed, comparing a reference signal with said motor-speed measuring signal to derive said DC control voltage, and using said DC control voltage to control the motor supply voltage by means of a negative resistance circuit arranged to make the motor back emf substantially independent of motor current so that the negative resistance circuit at least partly compensates for the internal resistance of the motor whereby motor speed is insensitive to rapid load fluctuations, the motor supply voltage being controlled by said control voltage to produce a substantially linear relationship between the motor supply voltage, motor current and the control voltage.

7. A control method as claimed in claim 6 wherein said periodic signal is derived by interrupting the current in the motor brushes to produce low frequency signal pulses induced by the rotation of the motor.

8. A speed control circuit for a DC motor comprising:
means for generating a low frequency periodic signal determined by the speed of the DC motor, a circuit responsive to said periodic signal for processing same to derive a DC voltage proportional to motor-speed, a comparator circuit for comparing said DC motor-speed voltage with a reference voltage indicative of the desired motor-speed thereby to derive a control voltage at the output of the comparator circuit, and a negative resistance circuit having a control input coupled to the output of the comparator circuit and an output coupled to the motor, said control voltage being operative via the negative resistance circuit for controlling the motor supply voltage such that a substantially linear relationship exists between the motor supply voltage, motor current and the control voltage, said negative resistance circuit being arranged to have a negative resistance which at least partly compensates for the internal resistance of the motor whereby the motor-speed is substantially insensitive to rapid load fluctuations.

9. A speed control circuit as claimed in claim 8 wherein said negative resistance circuit comprises, a current-mirror type of circuit including first and second branch circuits through which currents $I_2$ and $I_m/K$, respectively, flow, where $I_m$ is the motor current, $I_2$ is a reference current and K is a characteristic parameter of the current-mirror circuit, said control voltage controlling the current $I_2$ and thereby the motor-speed.

10. A speed control circuit as claimed in claim 8 wherein the negative resistance circuit includes transistor means connected in series with the motor so that said low frequency periodic signal comprises signal pulses produced by interruption of the current in the motor brushes, said speed control circuit providing low frequency speed control by means of a control loop formed by the motor, the generating means, the processing circuit and the comparator and providing high frequency control by means of the negative resistance circuit.

11. A speed control circuit as claimed in claim 8 wherein the processing circuit includes an integrator circuit and said negative resistance is equal to said internal resistance of the motor.

12. A speed control circuit as claimed in claim 8 wherein the negative resistance circuit comprises a current mirror circuit wherein a resistor with a resistance value $R_1$ has one terminal coupled to the motor and a second terminal coupled to first and second branch circuits such that a current $I_1$ flowing through said resistor divides into currents $I_2$ and $I_mK$ in said first and second branch circuits, respectively, where $I_m$ is the motor current and K is a characteristic parameter of the current mirror circuit, and wherein the values of $R_1$ and K are chosen so that $R_1/K$ defines the negative resistance of the negative resistance circuit and substantially compensates for the internal resistance of the motor.

13. A speed control circuit as claimed in claim 8 wherein said negative resistance circuit includes two branch circuits coupled to the motor with the current in one branch circuit controlled by the control voltage so as to control the motor speed.

14. A speed control circuit as claimed in claim 8 wherein said negative resistance circuit includes a resistor with a resistance value $R_1$ effectively connected in series with the motor and wherein the negative resistance of the negative resistance circuit is $R_1/K$ where $K$ is a characteristic parameter of the negative resistance circuit chosen so that the negative resistance term $R_1/K$ is approximately equal to the internal resistance r of the motor.

15. A device for controlling the speed of a D.C. motor comprising:
a first control circuit for controlling the motor supply voltage to a control value equal to a value $(I_2R_1)$ proportional to a reference current $(I_2)$, where $R_1$ is a resistor in said first control circuit, and reduced by a value $(Im/K) R_1$ proportional to the motor current (Im), where K is a parameter of the first control circuit such that the value $(Im/K) R_1$ is substantially equal to a voltage (Im.r) across the internal motor resistance (r), the first control circuit including comparator means for determining the difference between the motor supply voltage and the control value and means for controlling the motor supply voltage in dependence on the difference determined so as to compensate for load fluctuations of the motor, and
a second control circuit comprising:
means for deriving a low-frequency periodic signal (Sm) induced by rotation of the motor, a circuit for processing said periodic signal to derive a motor speed signal (Sv) comprising a direct voltage proportional to motor speed, a comparator circuit which compares said direct voltage (Sv) with a reference voltage indicative of desired motor speed, said comparator circuit having an output terminal at which a control voltage (Vo) is produced for modifying the reference current $(I_2)$ so as to compensate for slow variations of the motor speed.

16. A device as claimed in claim 15 wherein said processing circuit comprises a signal shaping circuit connected in cascade with an integrator circuit between said motor and one input of the comparator circuit.

* * * * *